(12) United States Patent
Donahue et al.

(10) Patent No.: US 7,853,478 B2
(45) Date of Patent: Dec. 14, 2010

(54) FUNDING INFORMATION DELIVERY USING ADVERTISING REVENUE

(75) Inventors: Joseph Jude Donahue, Woodinville, WA (US); Darrell LeRoy Blegen, Redmond, WA (US); Mark A. Stockwell, Longmont, CO (US)

(73) Assignee: Microsoft Corporation, Redmond, WA (US)

( * ) Notice: Subject to any disclaimer, the term of this patent is extended or adjusted under 35 U.S.C. 154(b) by 699 days.

(21) Appl. No.: 11/844,613

(22) Filed: Aug. 24, 2007

(65) Prior Publication Data

US 2009/0055256 A1 Feb. 26, 2009

(51) Int. Cl.
*G06Q 99/00* (2006.01)
(52) U.S. Cl. .................................. 705/14.43; 705/1.1
(58) Field of Classification Search ............... 705/14.11, 705/1.1, 14.4, 14.43
See application file for complete search history.

(56) References Cited

U.S. PATENT DOCUMENTS

| | | | |
|---|---|---|---|
| 6,425,010 B1 | 7/2002 | Alles et al. |
| 6,839,684 B1 | 1/2005 | Rissanen et al. |
| 7,062,469 B2 | 6/2006 | Meyers et al. |
| 7,200,633 B2 | 4/2007 | Sekiguchi et al. |
| 2002/0052925 A1 | 5/2002 | Kim et al. |
| 2002/0194065 A1 | 12/2002 | Barel et al. |
| 2005/0044569 A1 | 2/2005 | Marcus |
| 2005/0132049 A1 | 6/2005 | Inoue et al. |
| 2005/0147084 A1 | 7/2005 | Zhang et al. |
| 2006/0242267 A1 | 10/2006 | Grossman |

FOREIGN PATENT DOCUMENTS

| | | |
|---|---|---|
| KR | 2002-0009114 | 2/2002 |
| KR | 2002-0015223 | 2/2002 |
| KR | 10-2006-0080151 | 7/2006 |
| WO | WO 01/50368 A1 | 7/2001 |
| WO | WO 03/007172 A1 | 1/2003 |

OTHER PUBLICATIONS

International Search Report and Written Opinion mailed Mar. 20, 2009.
Kivisaari et al., "Content-Based Pricing of Services In The Mobile Internet," Date: Unknown; pp. 1-5, http://www.tml.tkk.fi/Opinnot/T-109.551/2004/Content_based_pricing.pdf.
Sage Journals Online, "Content Costs and Pricing Models in the Internet Age," Date: May 21, 2007; 1 Page, http://bir.sagepub.com/cgi/content/abstract/18/4/5.
IBS Case Development Centre, "Competitive Strategies—AOL's Ad-based BusinessModel," Date: May 21, 2007; 1 Page, http://www.ibscdc.org/case%20Studies/Abstracts/Strategy/Competitive%20Strategies/COM0102C.htm.

*Primary Examiner*—Jonathan Ouellette
(74) *Attorney, Agent, or Firm*—Merchant & Gould

(57) ABSTRACT

Embodiments are provided to deliver information to a user such that data information delivery costs are less than an amount of generated advertising revenue. In an embodiment, a system can be configured to deliver information, including content and advertisements, to a user which operates to remove the burden of payment for the information delivery by the user. In one embodiment, bandwidth, compression, minimization, protocols, timing, and other optimization parameters can be used to minimize the cost to communicate information, including content and advertisements, to a user. Embodiments can be configured to optimally package advertisements and content, such that advertising revenue can be used to compensate for or override costs associated with the transmission of the content and advertisements. Other embodiments and functionality are available.

19 Claims, 8 Drawing Sheets

FUNDING INFORMATION DELIVERY USING ADVERTISING REVENUE

BACKGROUND

Advertising is used in attempts to generate additional revenue for a business. Advertising can even improve goodwill with new and existing consumers for certain advertised goods and services. However, advertising costs can increase for a variety of reasons. For example, advertising communications can become expensive when providing ads using a high cost network, such as a cellular wireless data network. When the cost of transmitting advertising or content becomes greater than the revenue generated from advertising, a company may decide to reduce or abandon an advertising program.

Consequently, in many cases, advertising costs are passed to the consumer as a tax or service fee. Take for example, an advertising model used to provide advertisements to end-users over a high cost communication network. Coupled with the service cost to deliver content (e.g., a metered data service that charges by the amount of delivered data, a service plan that charges a periodic fee for data delivery, etc.) that is also passed to the consumer, the advertising model may result in lost customers and revenue. Moreover, charging additional fees for information delivery services can present a significant barrier to entry for potential users. A reluctance to purchase separate data delivery plans can operate to limit the potential reach of advertising to a user, thereby limiting the amount of revenue that may be reasonably forecast, while also limiting the audience which reduces the appeal to advertisers.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to deliver information to a user such that data information delivery costs are less than an amount of generated advertising revenue. In an embodiment, a system can be configured to deliver information, including content and advertisements, to a user which operates to remove a payment burden for the information delivery by the user. In one embodiment, bandwidth, compression, minimization, protocols, caching, timing, and other optimization parameters can be used to minimize the cost to communicate information, including content and advertisements, to a user. Embodiments can be configured to optimally package advertisements and content, such that advertising revenue can be used to compensate for or override costs associated with the transmission of the content and advertisements.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
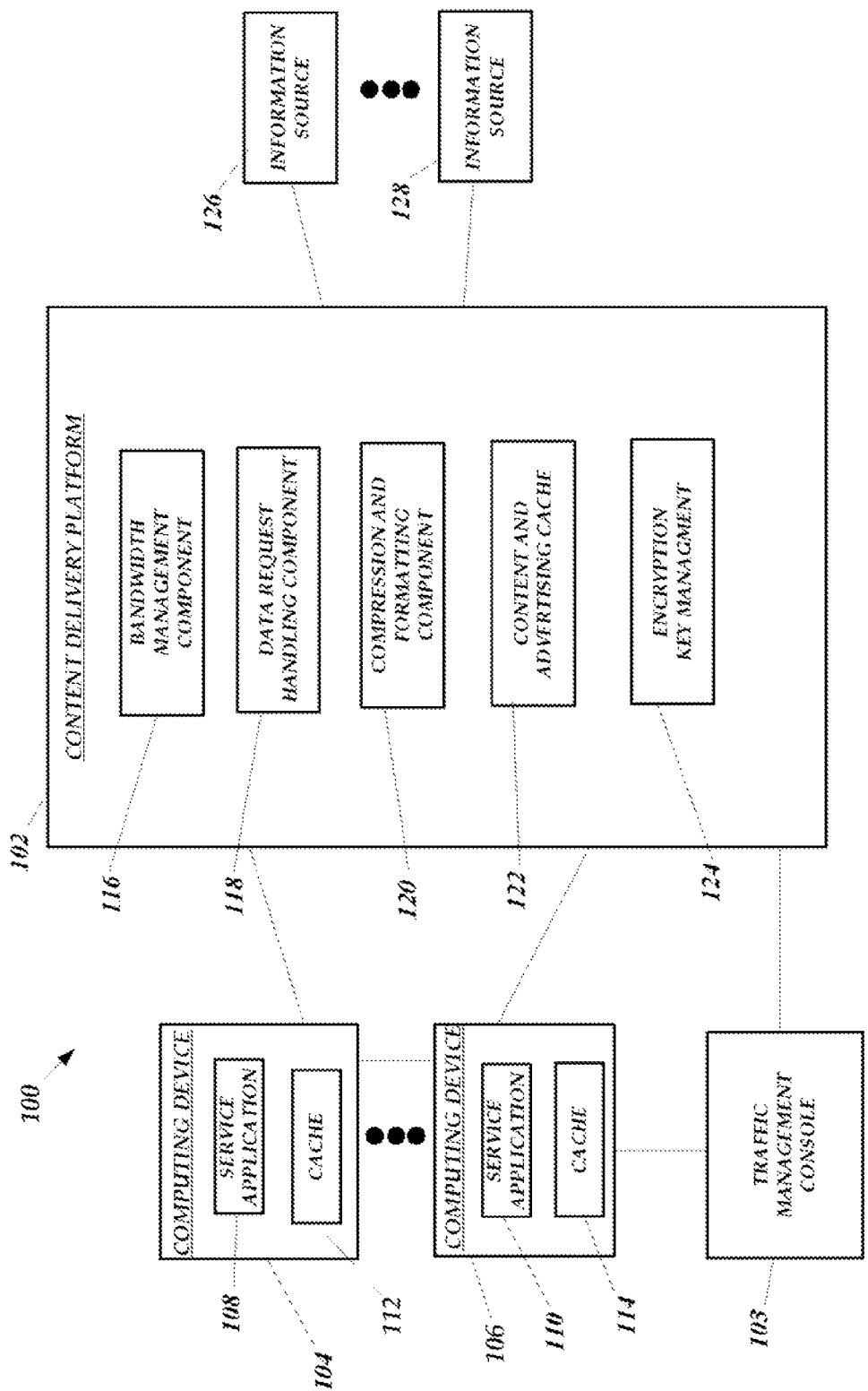
FIG. 1 is a block diagram of a system configured to provide content and advertisements.

Embodiments are provided to minimize an amount of transmission cost while maximizing an amount of revenue associated with a provision of content and advertising to a user of an information delivery service. In an embodiment, bandwidth, compression, minimization, protocols, caching, timing, and, and/or other communication parameters can be used to generate positive revenue as to a provided service, wherein a consumer is not charged for costs to transmit advertising and content to the consumer. For example, advertising revenue can be maximized by reducing associated transmission costs, such that a user is not charged for advertising traffic. An information provider can benefit from the advertising traffic by generating revenue therefrom. Transmission parameters can be used to control when content and advertisements are communicated to the user so that costs can be minimized and potential residual revenue can be realized based in part on the advertisements.

In an embodiment, a system can use a number of parameters as part of an equation to assess advertising revenue that can be associated with an information delivery service. In one embodiment, a system can use a number of optimization parameters to generate revenue based in part on an advertising model. The optimization parameters can include, but are not limited to: bandwidth optimization parameters; ad caching parameters; information compression parameters; delivery parameters; timing parameters; and other optimization parameters.

For example, the system can use information delivery timing parameters to control the delivery of information, including advertising information, to generate positive revenue and thereby prevent the passing on of transmission and other costs to a user of the information delivery service. As further example, the system can use a time cost associated with information delivery to determine a number of time periods to delivery the information in an effort to maximize residual revenue with minimal or zero cost being passed on to an information consumer. The system can take into account peak communication periods, which are usually associated with higher demand on a network, and off-peak communication periods which are usually associated with lower demand on the network, when determining how to deliver information to the user.

Correspondingly, a service provider or other interested party can use features of the system and associated optimization parameters in attempts to generate revenue as part of an advertising model. A service provider can use the features of the system to compensate for a number of costs associated with the service. For example, a service provider can use aspects of the system to generate revenue from advertisements to thereby compensate in part for bandwidth cost; infrastructure cost; development cost; historical cost; and, other costs associated with providing a service to an information consumer. Any residual revenue can be captured by the service provider and used to benefit the service provider.

For example, to maintain a positive revenue flow, an information provider can use components of the system to control the delivery of information such that the costs of transmission are less than the amount of revenue generated through advertisements. If an information provider realizes that data transmission costs were $100,000 and revenue generated through the communication of advertisements is $80,000, the information provider can make changes to various communication optimization parameters to reduce the transmission cost or increase the advertisement revenue.

In one embodiment, a portable computing device includes a pre-installed service application that can be used to interact with a delivery platform to receive information. The service application can be used to increase the reach of advertising by removing a potential cost barrier for a user. The pre-installed service application can be configured to enable the user to receive, or otherwise obtain, content and advertisements such that the user does not have to pay for data transmission costs associated with the delivery of the content and advertisements. Additionally, the probability that a user will use the pre-installed service application is probably higher than if the user were required to install the service application before use. Accordingly, the service application can be used to access desirable information, wherein the information can be minimized before being communicated, which can operate to reduce the cost associated with communicating the information. Correspondingly, an amount of advertising revenue can be generated and retained by a service provider, advertising publisher, or other entity as profit of the sale of advertising.

Various embodiments can be used to encourage a business arrangement between an advertising publisher and an operator of a digital information delivery service, wherein the digital information delivery service operator can provide digital information delivery at no or minimal cost to an information consumer in return for a share of advertising revenue that is a result of delivering advertisements to the information consumer. The various embodiments can also be used to encourage a business arrangement between an advertising publisher, an operator of a digital information delivery service, and a device manufacturer, wherein the digital information delivery service operator can provide digital information delivery at no or minimal cost to an information consumer in return for a share of advertising revenue that can result from the delivery of advertisements to the information consumer. A device manufacturer can install a service application on devices prior to sale, wherein the service application can be configured to display delivered digital information to the information consumer, including displaying advertisements with or without associated content.

FIG. 1 depicts a system 100 that is configured to deliver information, including content and advertisements, to a user in accordance with an embodiment. As described below, the system 100 can provide information to a user in such a manner that the user does not have to pay for the delivery of the information. Accordingly, the system 100 can be configured to provide information to a user such that costs associated with the information delivery are less than an amount of generated advertising revenue based in part on the communication of a number of advertisements. The system 100 can be configured to provide information to a user, including providing content and advertisements, wherein the delivery of content and/or advertisements can be controlled in a manner such that the transmission costs can be offset by revenue generated from the delivery and use of the advertisements. In one embodiment, the system 100 can use bandwidth, compression, timing, minimization, protocol, caching, rounding, and other optimization parameters to minimize transmission costs associated with the delivery of information.

As described below, a service application can operate to fetch or receive information, including content and/or advertisements, in the background for storage. The stored information can be viewed at a convenient time for an end user. Correspondingly, the service application can operate to quickly and efficiently respond to user requests for information, since there is not a delay for the retrieval of information from an outside source, such as a remote server for example. The amount of time the client will have to wait when fetching information can also be minimized, since the information can be minimized using a number of communication parameters for transmitting according to an efficient form, as described below.

As shown in FIG. 1, the system 100 includes a delivery platform 102, such as a dedicated serving computer for example, that can be configured to provide information, including designated content and directed advertisements, to a number of users. A number of computing devices 104 and 106 are shown to be in communication with the delivery platform 102. While two computing devices 104, 106 are shown to be in communication with the delivery platform, the system 100 can include any number of user computing devices. For example, the delivery platform 102 can be used to send designated content and advertisements to a user who is in communication with the delivery platform 102 using a smart phone.

The system 100 also includes a traffic management console 103 that can be used to manage and control the amount of information traffic communicated between the delivery platform 102 and a user device. While the traffic management console 103 is shown as a separate component, the traffic management console 103 and its associated functionality can be included as part of the delivery platform 102. For example, a network operator can use the traffic management console 103 to influence the amount of data traffic due to client requests. The traffic management console 103 also allows for the specification of an overall rate of information that will be sent to a user device, but is not so limited. As described below, a bandwidth management component 116 can be used to control parameters associated with frequency of requests, the time of day when requests are made, etc.

According to an embodiment, the computing devices 104 and 106 each include a service application or rich client 108 and 110, respectively. Each service application 108 and 110 can be configured as a software program, including executable instructions, to provide various functionality, as described below. For example, the service application, such as a rich client, can be used as part of an information delivery service offered by or through a service provider. The service application can also be offered to third parties to use as part of a revenue generating model based on network communications. The service applications 108 and 110 can be used to interact with the delivery platform 102. The service applications 108 and 110 can also be used to display content and advertisements on a respective computing device 104 or 106 as provided by the delivery platform 102.

The computing devices 104 and 106 also each include a cache 112 and 114 (e.g., RAM, flash memory, storage, etc.) for storing information, such as content and advertisements for example. Caching information, such as content and advertisements for example, on a users device results in having to communicate the information one time, wherein the user can view the information repeatedly or at the user's convenience, since it remains on the device until deletion. Moreover, a user does not have to have a live connection to view information, including an advertisement, stored in cache.

The service application 108 or 110 can operate to display an advertisement that may yield an increased amount of revenue associated with a given context or content. The advertisement can be displayed multiple times, wherein there is one cost transaction for the advertisement transmission. The advertisement can be used multiple times which operates to multiply potential revenue generated by the advertisement. For example, a business may pay an information provider an amount of money each time an advertisement is displayed, wherein the paid amount can change based on an advertising target. Constraints associated with how many times an ad can be shown to the same consumer can also be supported.

For example, an advertiser may pay more for an advertisement that is displayed to a local consumer as compared to some remote or unassociated user. Since the advertisement can be displayed multiple times while only having a single transmission cost, the information provider can capitalize on the multiplying effect of multiple ad displays. For example, user preferred data can be periodically communicated to a handheld device where the data is stored locally in cache for convenient viewing. Items can be retained according to a storage algorithm (e.g., first-in, first-out (FIFO) algorithm), whereby newer items can displace older items in the cache.

Continuing with the example, weather information can be stored in cache for a period of time and then discarded if the information is not replaced by newer updates. In this example, advertisements can be retained in the cache until an expiration date is reached when the advertisements can be deleted from the cache and replaced with new advertisements. Correspondingly, information can be sent once to the device and retained for multiple viewings without having to retransmit the information, including content and advertisements, to the device.

The information stored in cache 112, 114 can be used or interacted with at a desired time. Accordingly, the information can be viewed directly using the cache 112 or 114, rather than having to wait for the computing device to receive or otherwise obtain information from the delivery platform 102. Moreover, an advertisement can be used multiple times, thereby potentially multiplying or increasing revenue generated by the advertisement due to the multiple interactions. To simplify the foregoing discussion, the computing device 104, service application 108, and cache 112 will be referred to when describing features of the system 100. As described further below, service application 108 can be configured to request information (e.g., periodically or at some desired time) from the delivery platform 102. The request rate can be configured to lower the cost of sending requests to the delivery platform 102 and to maintain a collection of recent information in the cache 112.

Accordingly, the slower the rate for requesting information, the lower the cost of initiating the requests. Likewise, the delivery platform 102 can be configured to request information from the computing device 104. For example, the computing device 104 can be used to make calls to the delivery platform 102, and the delivery platform 102 may respond by providing instructions as to when the computing device 104 should next initiate communication with the delivery platform 102.

The computing device 104 can use the service application 108 to display information, such as desirable content and/or advertisements. As described above, a user is not charged for the communication or display of the information, other than the cost of the computing device and/or the service plan associated with the service provider. That is, the user is not charged extra for information delivery. For example, as shown in FIG. 6, a device is displaying weather information associated with a certain locale. The device is also shown displaying an advertisement directed to an end user. The user is not charged for the weather and advertisement transmission costs.

As described below, the delivery platform 102 can operate to communicate a number of advertisements to the device 104 which can be cached for subsequent or present display. In one embodiment, the service application 108 can be configured to display one or more advertisements based in part on the content currently being displayed and/or in focus on the device 104. The service application 108 can also be used to calculate an amount of revenue associated with a display of a number of advertisements based in part on a charge or cost per advertisement.

In one embodiment, the service application 108 can calculate an amount of revenue based in part on certain user interactions with a computing device that is displaying or otherwise communicating (audible, video, etc.) an advertisement. That is, the service application 108 can detect and track an interactive operation associated with an advertisement to determine a number of revenue associated parameters (e.g., counts, etc.) associated with the advertisement. The service application 108 can also track any content being viewed or interacted with when a user interacts with the device while displaying an advertisement.

A historical record can be created and maintained in the device 104 or transferred to the delivery platform 102 for future use in directing advertisements to a particular user or device. For example, the service application 108 can track and maintain an ad count that can be updated when an advertisement is displayed on a device and a user proactively interacts with the device in some manner (e.g., hits a key to light the backlight, presses a key, scrolls to an ad, clicks on an ad, etc.) The ad count can be stored locally in cache or uploaded to the delivery platform 102.

The service application 108 can collect the interactions, determine which advertisements were being displayed during the user interactions, and then determine an amount of revenue generated through the advertisements, based on certain characteristics of the display and/or a cost associated with the delivery of each advertisement. For example, the duration of the display, any action taken by the viewer of the ad, the amount price point of the ad for different demographic segments of the population, and other details may be taken into account when assessing advertising revenue. Network capacity, user service contracts, and quality of service may also affect the cost of delivery.

In one embodiment, the service application 108 can be configured to quantify the economic return for each advertisement and optimize a selected advertisement based on various revenue generation parameters. In another embodiment, a two-stage ad server can be used, wherein a first stage can be configured to send a collection of advertisements to a user's device and a second stage, such as a remote component, can select advertisements from the collection based on context, content, and/or some other variable. Thereafter, the service application 108 can report the amount of revenue back to the delivery platform 102. Alternatively, the collected interactions can be communicated to the delivery platform 102 for determining an amount of revenue generated through one or more advertisements.

With continuing reference to FIG. 1, the delivery platform 102 includes a number of associated components which allow an information provider to potentially generate revenue based in part on an advertising model. For example, components of the delivery platform 102 can use historical advertising revenue to determine an efficient way to deliver one or more advertisements to the computing device 104. For example, a number of advertising revenue parameters can be used to determine the most economical way to communicate one or more advertisements to an associated computing device. The delivery platform 102 can also determine an efficient packaging for the one or more advertisements and/or content, schedule a delivery for the one or more advertisements and/or content, and select a communication protocol in order to deliver the information to generate a positive revenue stream. However, the delivery platform 102 is not intended to be limited to a certain number of components, a particular configuration, or functionality.

In an embodiment, the delivery platform includes a bandwidth management component 116, a data request handling component 118, a compression and formatting component 120, an information cache 122, and an encryption key management component 124. The bandwidth management component 116 can be configured to manage an amount of transmission bandwidth when communicating information to the computing device 104. For example, the bandwidth management component 116 can determine an amount of information to transmit based in part on the type of communication channel that the computing device 104 is using to communicate with the delivery platform 102.

The data request handling component 118 can be configured to handle data requests from the service application 108 using the computing device 104. The data request handling component 118 can also be used to gather and update information by communicating with or querying a number of information sources 126 and 128. For example, the information sources may be able to provide news (e.g., CNN, MSNBC, BBC, etc.), weather (e.g., weather.com), sports (e.g., ESPN), traffic, finance, etc.

One or more of the information sources 124, 126 can also include a number of advertisements for downloading or otherwise communicating to a client device. In one embodiment, an advertising source can be configured as an ad center (e.g., adsoftware.dll) to provide advertisements associated with a good or service provider. For example, the delivery platform 102 can be used to interface with a number of information providers, passing on requests for information from any associated computing devices, and capturing the response(s). Captured information can be formatted and otherwise optimized according to an efficient data structure for transmission to a requesting computing device.

The data request handling component 118 can store the gathered information in the information cache 122 or some other storage area. For example, the data request handling component 118 can be used to gather weather information from a weather source, sports information from a sport source, news information from a news source, etc. The information cache 122 can also be used to store user preferences for use in delivering information to an associated user. In one embodiment, configuration information is communicated only when it changes, thereby reducing or eliminating information traffic associated with sending data request information with each request.

The compression and formatting component 120 can be used to compress and format information before communicating the information to the computing device 104. In an embodiment, the compression and formatting component 120 can serialize information before transmission, including using a number of content-based templates as part of the serialization process. The compression and formatting component 120 can package information based in part on a serial format according to templates that can be established for each type of information to be communicated. Thereafter, a brief template designator can accompany the packaged information during the communication.

The service application 108 can use the communicated template designator to select the template that will be used to unpack the information. As a result, metadata may be eliminated, thereby operating to further minimize the communication of information, resulting in a more efficient communication with less cost. Correspondingly, the compression and formatting component 120 can contribute to efficiently package the information into a prescribed format or formats with minimal or no descriptive information.

The compression and formatting component 120 can also use a protocol that can eliminate most or all header information and associated handshake packet traffic. The compression and formatting component 120 can also remove extraneous protocols (e.g., HTTP, HTML, XML, etc.) and use a minimal format (e.g., binary-based format) to transmit information to a computing device. Correspondingly, transmission costs can be further reduced by compressing and formatting the information before delivery to the computing device 104.

The encryption key management component 124 can be used to encrypt and decrypt information communications between the delivery platform 102 and user devices. Encryption techniques can be used to ensure that customer data is kept private, while also preventing attacks on the delivery platform 102. User information can be collected, processed, and stored in accordance with applicable privacy legislation and rules.

In one embodiment, components of the delivery platform 102 can be used to optimize the communication of information based on characteristics of an associated communication network (e.g., bandwidth, latency, transmission costs, transmission traffic, transmission intervals, etc.). For example, an operator can use the traffic management console 103 to program peak communication times (i.e., higher cost) and a perceived cost for each type of communication network. Thereafter, the delivery platform 102 can operate adjust the information delivery so that a value equation based in part on generated advertising revenue remains positive.

The delivery platform 102 can be configured to control a number of communication parameters, including, but not limited to: communication periodicity, quantity of data, protocol configuration, caching schedules, data expiration, and other parameters associated with the delivery of information to a user. For example, the delivery platform 102 as part of caching schedules and expiration of data features, may package a weather forecast with information that informs the service application 108 that the forecast is good for two days. Based on that information, the service application 108 can cache the forecast for two days. Advertisements can also have a shelf life and the delivery platform 102 can include expiration information associated with the life of an advertisement which the service application 108 can use when storing advertisements in cache.

Thus, the delivery platform 102 can use one or more of the foregoing optimization features to package information to be presented to an end user, but is not so limited. The delivery platform 102 can send a number of ads to a user device automatically or based on a request. For example, the delivery platform 102 can automatically send 20 different ads to a user handset, wherein the 20 ads can be stored in cache 112. An ad may be able to be monetized a number of times and the advertising model takes advantage of the monetization. Research has shown that an ad may be viewed at least 10 times. Thus, based on the research, 20 ads viewed 10 times each equates to 200 displays which can be used when determining an amount of revenue based on the 20 ads. Alternatively, the service application 108 can be used to proactively locate and download one or more ads.

The delivery platform 102 can optimize the delivery of content and advertisements based in part on the knowledge of what has been already transmitted to a user device. Based on transmission costs and historical advertising revenue, the delivery platform 102 can inform the service application 108 to adjust the time for sending content and advertisement requests. For example, if certain advertisements are not generating enough revenue to pay for the associated transmission costs, the delivery platform 102 may change various request intervals to a longer or shorter duration based on the particularities of the communication parameters and user interactions.

The computing devices 104 and 106 can communicate with each other and other communication devices. The computing devices 104 and 106 can also communicate with the delivery platform 102 over a communication channel as part of a networked or other communication service. For example, a network can include the communication infrastructure and functionality, including communication applications, associated with a high throughput packet data network. Moreover, the various components of FIG. 1 can communicate using one or more networks, via the Internet for example, or other communication environments, including wired, wireless, combinations of wired and wireless, and other communication infrastructures. The system 100 includes networking, security, and/or other communication functionality to provide a communication environment. The system 100 and its components include functionality to communicate with other computing devices, and/or other systems and is not intended to be limited to the embodiments and examples described herein.

For example, the system 100 can be implemented as part of networked, distributed, or other computing environment. A number of client computing devices, including desktop computers, laptops, handhelds, and/or other smart devices can interact with and/or be included as part of the system 100. The system 100 can also include multiple clients and is not limited to any particular configuration, wherein each client can include various functionality and other components.

Figure 2:
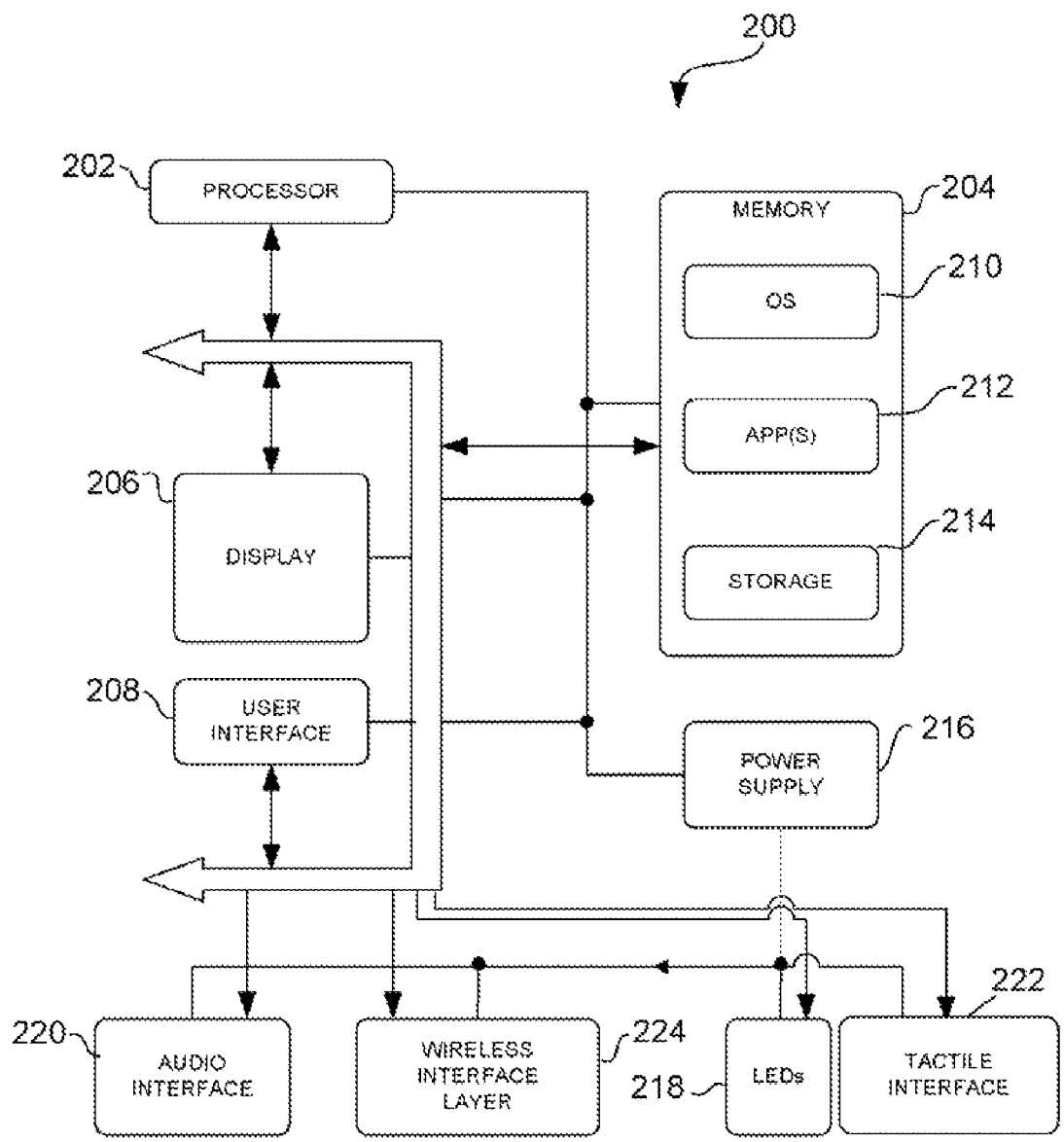
FIG. 2 is a block diagram of a computing device for displaying content and advertisements.

FIG. 2 is a schematic diagram illustrating functional components of a computing device 200, such as a portable electronic device, in accordance with an embodiment. The electronic device 200 has a processor 202, a memory 204, a display 206, and a user interface 208, but is not so limited. The memory 204 can include volatile memory (e.g., RAM) and non-volatile memory (e.g., ROM, Flash Memory, or the like). The computing device 200 includes an operating system 210, such as a WINDOWS operating system from MICROSOFT Corporation, which is resident in the memory 204 and executes on the processor 202. The user interface 208 may be a series of push buttons, soft keys, a scroll wheel, inking mechanism, a numeric dialing pad, and/or another type of user interface means. The display 206 may be a liquid crystal display, a multiple bit display, a mechanical display, a hybrid display, a full color display, or any other type of display used in electronic devices. For example, the display 206 may be touch-sensitive that would allow user interaction with the computing device 200.

One or more application programs 212 can be loaded into memory 204 and run on the operating system 210. Examples of application programs include phone dialer programs, e-mail programs, scheduling/calendaring programs, PIM (personal information management) programs, Internet browser programs, service applications, etc. The computing device 200 also includes a non-volatile storage 214 that is located within the memory 204. The non-volatile storage 214 can be used to store persistent information which should not be lost if the computing device 200 is powered down. The applications 212 may use and store information in the storage 214, such as e-mail or other messages used by an e-mail application, contact information used by a PIM, appointment information used by a scheduling program, documents used by a word processing application, content and advertisements used by the service application, etc.

The computing device 200 has a power supply 216, which may be implemented as one or more batteries for example. The power supply 216 can also include an external power source, such as an AC adapter or a powered docking cradle that can be used to supplement or recharges the batteries. The computing device 200 is also shown with various types of external notification mechanisms: one or more light-emitting diodes (LEDs) 218, an audio interface 220, and a tactile interface 222. These various mechanisms and interfaces may be directly coupled to the power supply 216 so that when activated, they remain on for a duration dictated by a notification mechanism even though the processor 202 and other components might shut down to conserve battery power.

The LEDs 218 may be programmed to remain on indefinitely until the user takes action to indicate the powered-on status of the device. The audio interface 220 can be used to provide audible signals to and receive audible signals from the user. For example, the audio interface 220 may be coupled to a speaker for providing audible output and to a microphone for receiving audible input, such as to facilitate a telephone conversation, or as a user interface using voice recognition. The tactile interface 222, such a as vibration element for example, can be used to give feedback to the user such as for alerting the user of a newly arrived content and/or advertisements. The computing device 200 may control each alert mechanism separately (e.g., audio, vibration, as well as visual cues).

The computing device 200 also includes a wireless interface layer 224 that can be configured to receive and/or transmit wireless communications (e.g., GPRS, CDMA, etc.). The wireless interface layer 224 facilitates wireless connectivity between the computing device 200 and the outside world, via a communications carrier, service provider, or other communication provider. Transmissions to and from the wireless interface layer 224 can be controlled by the operating system 210. In other words, communications received by the wireless interface layer 224 may be disseminated to application programs 212, such as by delivering content and advertising updates, via the operating system 210, and vice versa.

Figure 3:
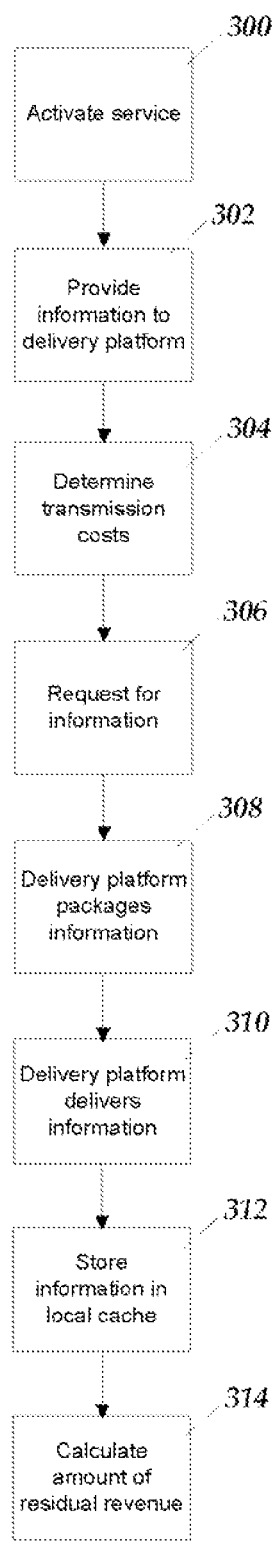
FIG. 3 is a flow diagram illustrating an advertising and content delivery process.

FIG. 3 is a flow diagram illustrating a process for generating advertising revenue based in part on controlling the delivery of content and a number of advertisements to a user, under an embodiment. The components of FIG. 1 are used in the description of FIG. 3, but the embodiment is not intended to be so limited. At 300, a user signs up for service and activates a service application 108. As described above, a user can purchase a device with a pre-installed service application. In one embodiment, the user only has to pay a monthly service fee or a one time signup fee which includes all communication transmissions, including, voice, data, advertising, and other transmissions. For example, the user will not be charged a per megabyte (Mb) charge for data deliveries.

As described below, the user can use the service application 108 to provide various content, such as news, weather, sports, etc, without having to pay additional fees on top of a monthly service fee. For example, when signing up for a new service, a user can select from a number of service options, wherein each option can include different features and price. For example, a service provider may offer gold service, silver service, or bronze service. Based on the type of service, a qualitative measure of a selected service can be coded and used by the delivery platform 102 to adjust certain parameters associated with the selected service. For example, each type of service may include a different update frequency (e.g., weather frequency from every 15 minutes (per the gold service) to once an hour (bronze service)). Then, based on the update frequency, the device 104 can pull down new information. In one embodiment, each service can be tailored in accordance with high cost periods of the network. For example, from 3 pm to 6 pm, the updates are once an hour; from midnight to 4 am, the updates are every 20 minutes.

The user can also receive tailored advertisements and promotions according to user preference or other targeting factors. At 302, if the user has opted for the service, the service application 108 is initialized which includes providing user and device-related information to the delivery platform 102. For example, the service application 108 can inform the delivery platform 102 of a communication network that is associated with the device 104, the type of device 104, and content features and characteristics (e.g., weather, sports and news; weather and news; news and sports, traffic, etc.).

For example, a user can buy a smart phone or other handheld device that includes a free service application 108. Thereafter, when the user begins configuring the handheld device, the service application 108 can automatically launch, alerting the user of the free access to a number of content-based channels and asking the user to select a number of the channels to use or to opt-out of the service. The user can use toggle-keys to select weather and traffic channels for example. The delivery platform 102 can use the selection information to provide weather and traffic, and can package the information, including advertisements, to maximize revenue so that the user does not have to pay for data and other per transmission fees.

A number of configuration settings can also be provided to the delivery platform 102 as part of the initialization. That is, as part of the service initialization, users can select the type of information to be displayed through configuration settings on an associated device (such as a handset for example). For example, a customer may be interested in weather information but not news. In this case, the customer configuration settings will indicate that weather information is to be sent to the customer, but not news. Correspondingly, only information that the customer has requested is sent (with the exception of certain advertisements), further operating to minimize an amount of communicated information.

Updated configuration settings can be communicated to the delivery platform 102 when changed by the user. In an embodiment, the configuration information can be stored in the information cache 122 in association with a unique ID associated with the user device. Thereafter, as described below, when the service application 108 sends a request for information, the unique ID can be included with the request. The delivery platform 102 can use the unique ID to look up the associated configuration settings, and can send the requested information accordingly. Accordingly, the burden of repetitively transmitting the configuration information may be eliminated, further operating to minimize the amount of communicated information and associated cost.

At 304, the delivery platform 102 can determine transmission costs associated with the type of network which can also be based in part on the amount and type of content to be delivered. For example, a WiFi network may have minimal transmission cost, whereas different cellular providers may have differing transmission costs, foreign-based networks may have higher transmission costs than a domestic network, etc. Based on the type of network, the delivery platform 102 can determine a transmission cost for each designated transmission period (e.g., peak, off-peak, etc.). Components of the delivery platform 102 can also take into account a value that a user places on different types of content. For example, the delivery platform 102 can be configured to deliver customized content to the user based on user specifications or preferences.

At 306, the service application 108, via the device 104, requests information from the delivery platform 102, based in part on the user content, other preferences and configuration details. At 308, the delivery platform 102 can use a number of optimization features and parameters to optimize the transmission of information such that the transmission cost can be offset by the generation of advertising revenue. As described above, revenue can be generated based in part on user interaction with an advertisement. For example, the interaction can include viewing an advertisement, taking action on the advertisement, etc.

A higher level of revenue may be associated with a higher level of evidence of interaction (a click correlated with a higher level than a view for example). The delivery platform 102 can be used to ensure that advertising revenue exceeds transmission costs. It can do so by having an ad viewed multiple times on a given device so it is monetized many times but transmitted only once. As described above, the advertising revenue can be determined based in part on a type of advertisement on display when a user interacts with the user device.

The advertising revenue can be increased further if the user interacts with the device on multiple occasions with one or more advertisements. Since advertisements can be cached locally, the transmission costs associated with multiple transmissions (e.g., advertisements may only have to be transmitted once) can be avoided, while maximizing the visibility of an advertisement. Additionally, an advertiser may pay more to display an advertisement based in part on an advertisement display time (during peak viewing hours), the size of an advertisement, the content of an advertisement, user identity and location, etc.

With continuing reference to FIG. 3, at 308, components of the delivery platform 102 operate to package the information, which can include one or more advertisements, using a number of optimization parameters for delivery to the user device. In one embodiment, the delivery platform 102 can operate to package one or more targeted advertisements based in part on the configuration settings and a user's identification characteristics. For example, the delivery platform 102 may package a number of advertisements for delivery to a targeted user based on a user's historical purchasing pattern. Advertisements can also be packaged based on other user-related information, such as the user's location for example. Moreover, an advertiser may be willing to pay more per advertisement when directed to a specific target (e.g., user locations, user interests, user habits, income level, etc.).

At 310, the delivery platform 102 delivers the packaged information to the user device. As described above, transmission of information to and from the delivery platform 102 is optimized to reduce costs associated with a transmission. For example, information can be communicated to and from the delivery platform 102 at the lowest cost time on a network. In an embodiment, one or more advertisements and content can be delivered to a requesting device simultaneously at a time when transmission costs are low as compared with other transmit times. In another embodiment, an advertisement can be sent at a different time as compared to delivered content. Bandwidth, timing, and other transmission issues can be taken into account when deciding how to maximize residual revenue through advertising when delivering content and advertisements. Alternatively, the service application 108 can proactively retrieve packaged information from the delivery platform 102.

At 312, the service application 108 operates to store the delivered information in the cache 112. Thereafter, the service application 108 can operate to display portions or all of the stored information to the user. The service application 108 can then send information (e.g., ad counts, ad frequency, etc.) to the delivery platform 102 to determine an amount of revenue generated by one or more advertisements. The delivery platform 102 can aggregate the amount of generated revenue across all users associated with a service. At 314, the delivery platform 102 can calculate an amount of residual revenue based in part on the aggregation of advertising revenue as compared to the transmission costs associated with delivering content and advertising to the end users. If the residual revenue is small or negative, the delivery platform can adjust various transmission parameters as described above in attempts to recover a larger residual revenue stream. Revenue and other cost associated data can be calculated at various times (e.g., weekly, monthly, quarterly, etc.).

Figure 4:
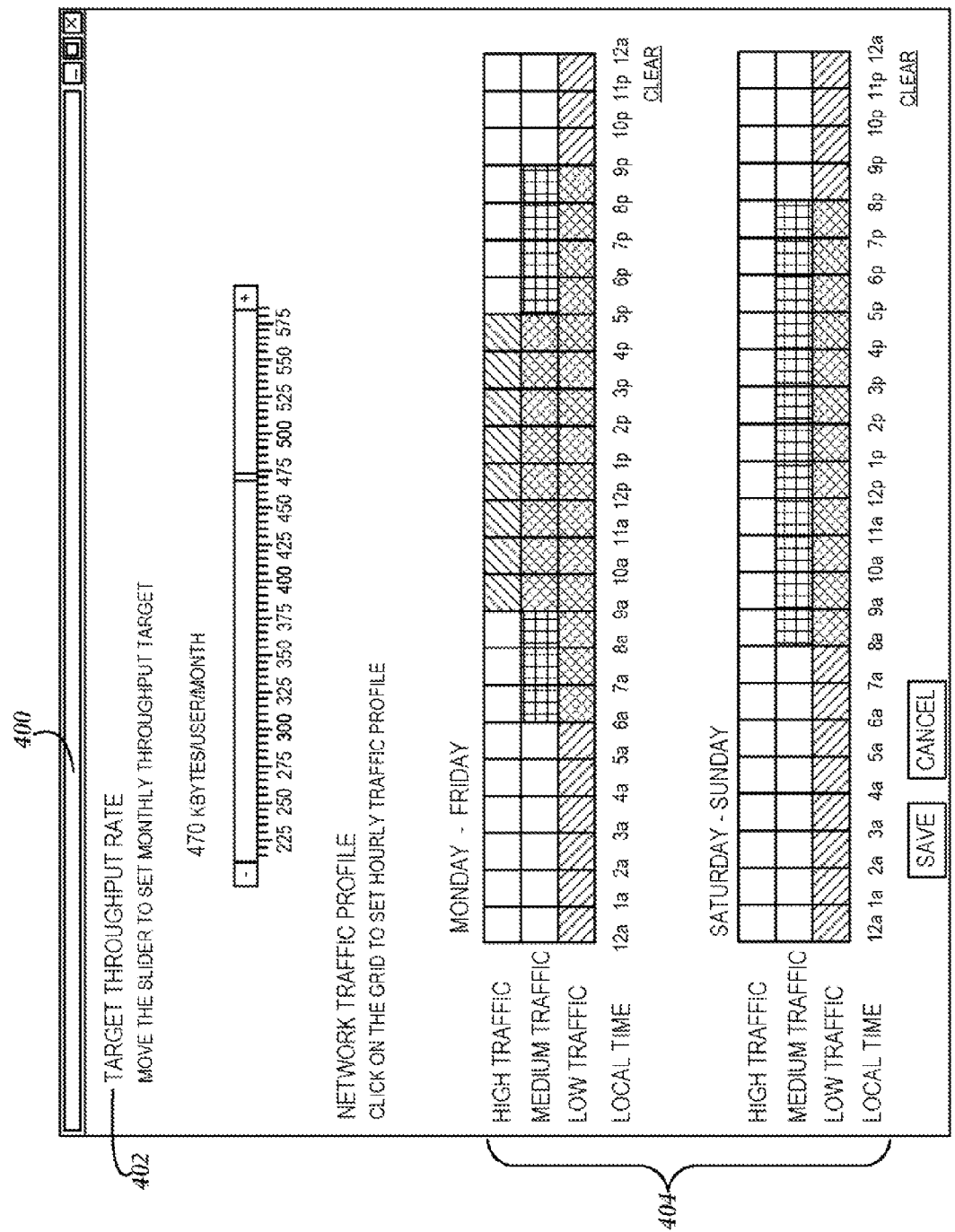
FIG. 4 depicts a traffic management console.

FIG. 4 depicts a traffic management console 400 of an embodiment that a user, such as a service operator for example, can use to control a number of communication parameters associated with the delivery of content and advertisements. As shown, the user can use the traffic management console 400 to specify a target throughput rate 402 (e.g., expressed in total Kbytes per user per month) and the anticipated load 404 on an associated network (e.g., by time of day and by day of the week). The delivery platform 102 can respond to the communication control parameters by adjusting the communication of information to user devices. For example, the delivery platform 102 may adjust daily downloads (e.g., advertisements and content) to off-peak hours and/or by reducing the rate of client requests for data during peak hours.

Figure 5:
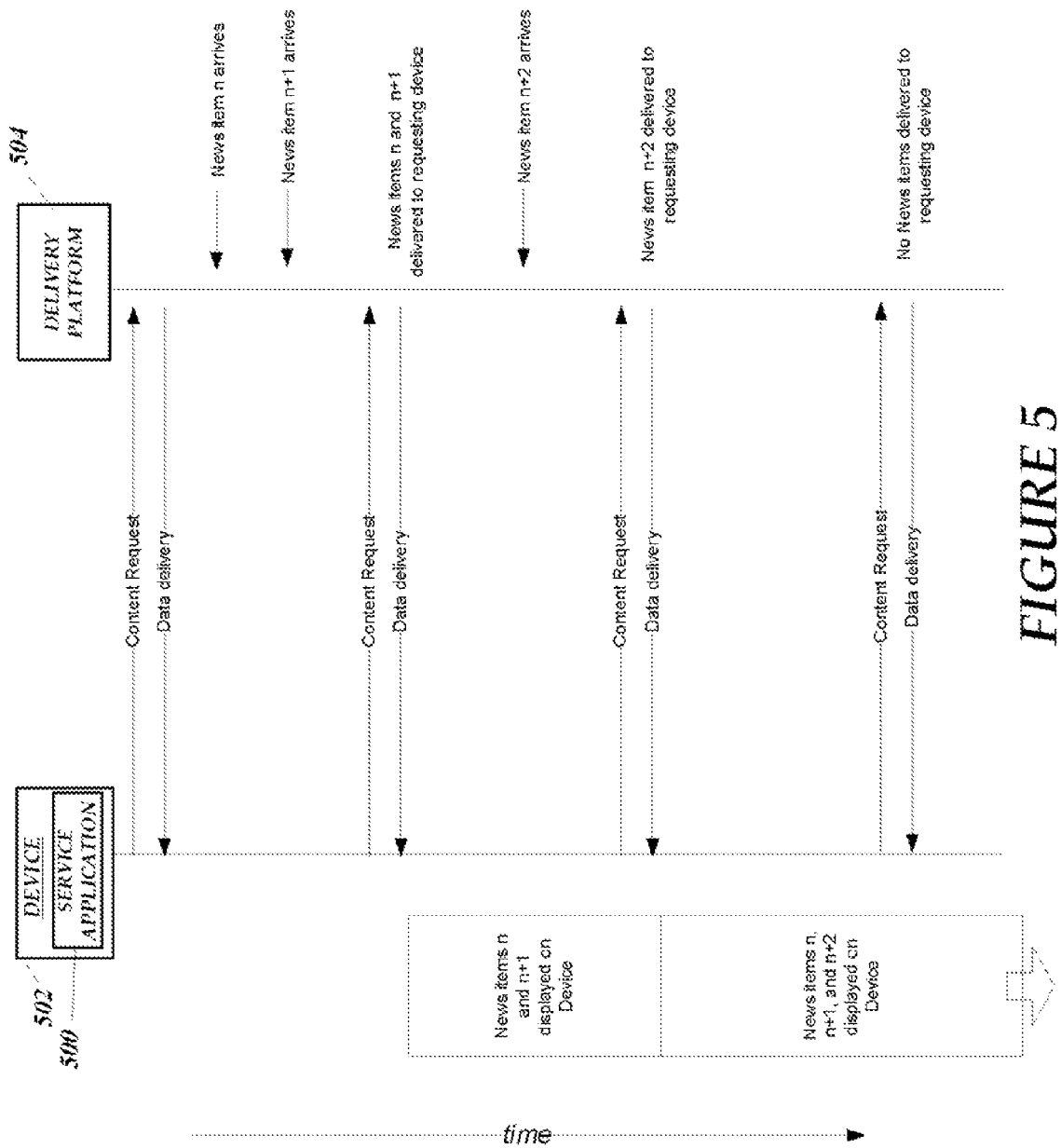
FIG. 5 is a diagram depicting a communication scenario.

FIG. 5 depicts a communication scenario including a user device 500 and a delivery platform 502. As shown, at various times, the user device, via a service application, requests content from the delivery platform 502. As described above, the user can configure the service application to obtain preferred content from the delivery platform 502 at desired times. The delivery platform 502 can control a number of transmission parameters to efficiently package content (and/or advertisements) such that the transmission cost to transmit the content (and/or advertisements) can be offset by revenue generated through advertisements.

As shown in FIG. 5, a periodic request can be communicated using the service application 500 via the user's device 502. For example, the request can contain information about the device 502 and the associated communication network, types of information to be delivered by the delivery platform 504, and the time of the last request from the device 502. The delivery platform 504 can respond to requests by delivering any new content (and/or advertisements) since the time of a last request. If there is no new content for any given channel, the delivery platform 504 may not deliver any content to the requesting device 502. As described above, the delivery platform 504 can obtain content from a number of information sources (shown in FIG. 5 as the "arrival" of news items).

In the example shown in FIG. 5, two news items are delivered by the delivery platform 504 in response to a second request from the device 502. One news item is delivered by the delivery platform 504 in response to a third request from the device 502. Lastly, no items are delivered delivery platform 504 in response to a fourth request by the device 502. A request interval can be determined by the delivery platform 504 and may vary according to a number of factors (e.g., time of day, weekday/weekend, etc.). For example, a network operator may use a traffic management console to change a number of delivery preferences to control the delivery of information to the device 502.

Figure 6A:
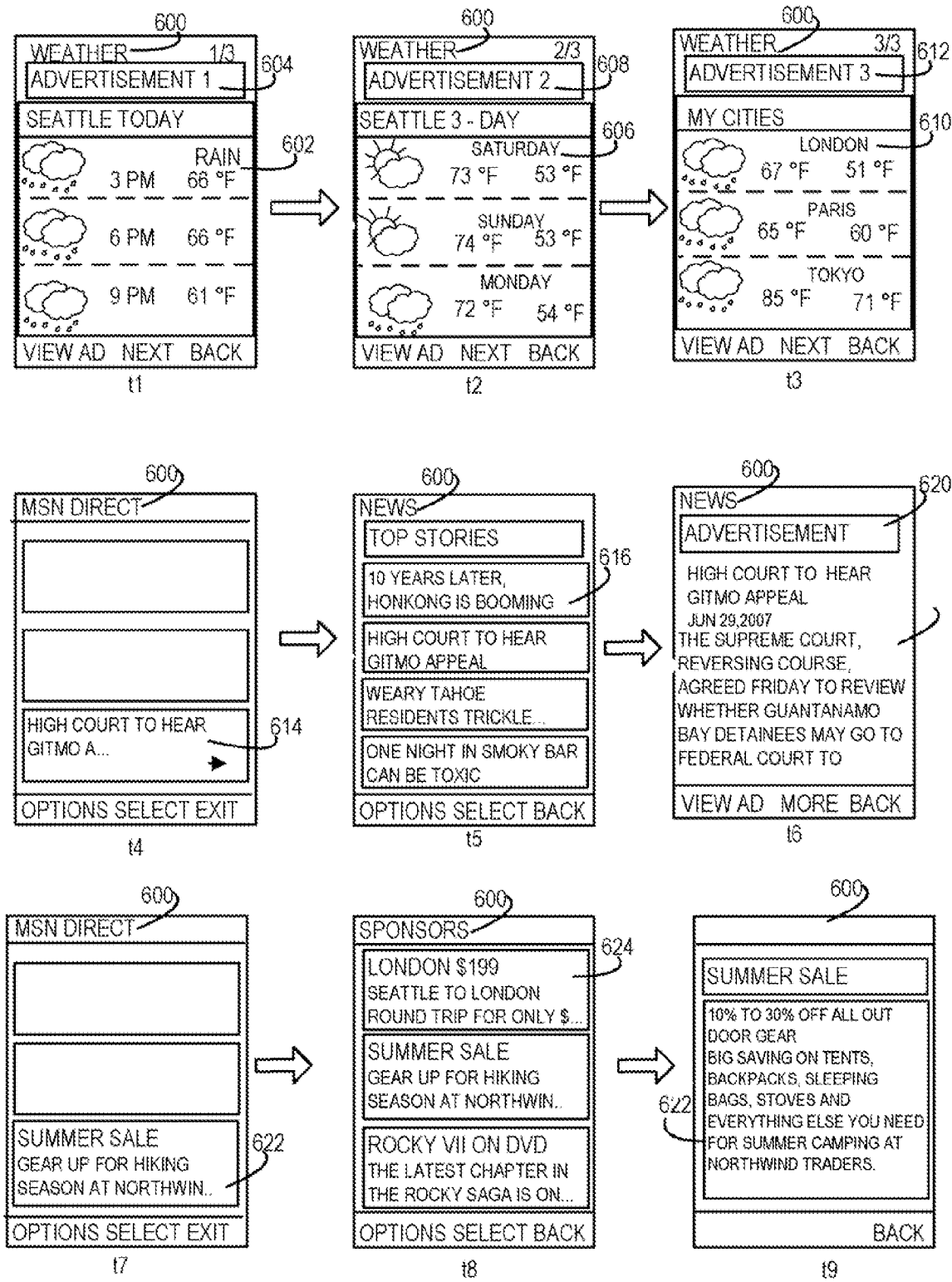
FIGS. 6A-6B depict a device display at various times displaying content and advertisements.

FIGS. 6A-4B depict a device display 600 as presented to a user at various times as an example. Content and advertisements can be displayed as shown according to a progressive timeline from t1-t11. The device display 600 can be partitioned and various partitions can be used to display content and/or advertisements. At t1, the service application 108 is operating to display current weather content 602 and an advertisement 604 based on the users location. At t2, the service application 108 is operating to display a 3-day weather forecast 606 and a different advertisement 608. At t3, the service application 108 is operating to display a weather forecast 610 for a number of preferred cities and another advertisement 612. At t4 and t5, the service application 108 is operating to display news content 614 and 616 to a user.

Figure 6B:
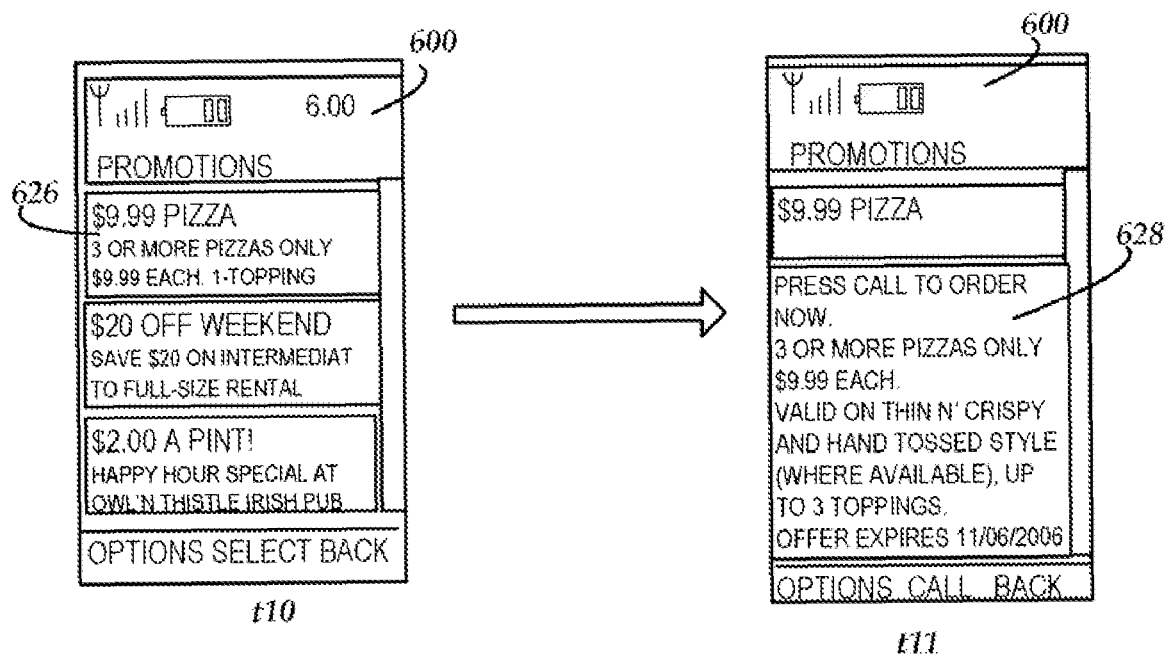

At t6, the user has selected a particular news story 618 (in focus) which is displayed by the service application 108. The service application 108 is also displaying an advertisement 620 directed to an interest of the current user in an effort to generate advertising revenue based in part on the users interaction with the device while the advertisement is being displayed. At t7 and t8, the service application 108 is operating to display a number of advertisements 622 and 624. At t9, the user has selected a particular advertisement 622, wherein greater detail is provided to the user for the advertisement 622. As shown in FIG. 6B, at t10, the service application 108 is operating to display a number of advertising promotions 626 to the user.

At t11, the user has selected a particular advertisement 628, wherein more information is provided to the user for determining whether the advertisement 628 is worthwhile. Since the user has interacted with the device while an advertisement 628 is being displayed, an amount of revenue can be generated and accounted for when determining an amount of residual revenue based thereon. As described above, the content and advertisements can be stored locally on the device, so that the user does not have to wait for information downloads. Accordingly, advertisements can be used and viewed multiple times without multiple transmission costs, thereby potentially providing an increased amount of advertising revenue that can be generated through the use and display of an advertisement.

Advertisements and content that are stale or that have reached an expiration date can be automatically deleted from a device to release storage space for new content and advertisements. The content and/or advertisements can be displayed on the device at periodic intervals according to user preferences and/or a display model which operates to increase an amount of revenue generated through advertising. For example, an advertisement or advertisements may be shown multiple times in different viewing scenarios in order to maximize the visibility of the advertisement or advertisements.

In one embodiment, the service application 108 is configured to appear on a device display at the home screen along with other applications that the user can select. Initially, content can be displayed in banner format. Content can be periodically displayed in a pre-defined order cycling through a number of different channels, some of which are listed below. The display can be automated for the purpose of allowing each channel summary banner to be displayed without user interaction.

As shown in the example of FIGS. 6A-6B, a weather channel is opened. Other channels can be opened in similar fashion to display particular content and/or advertisements. As described above, advertisements can be associated with and directed to a user based in part on the content being displayed or interacted with. The service application 108 can operate to display each channel, according to user preference, for a period of time so that all of the channels are displayed without user intervention. Accordingly, a user can passively discover all of the content that is available. The user can change a channel to display different content using one or more input controls (e.g., left and right navigation controls). Once a banner screen is displayed for any given channel, the user can activate a full-screen display to access additional details.

Weather Channel

The weather channel banner screen displays current conditions (weather and temperature) for a local city. Opening the channel brings up the first of a number of pages of weather information. Subsequent pages provide additional forecast data and current conditions in other cities selected by the user. The user can select which cities are displayed through the Options command on the "Other Cities" page. After the selected city is changed, the change is stored locally so that the display reflects the new settings. The user can also select the units that are displayed trough the Options command.

News Channel

News headlines can be displayed on the News channel banner. Headlines from current news items can also be displayed in rotation. When the user sees an interesting headline, opening the news channel can display a list of news items currently available, with the headline item from the banner already highlighted. Selecting the highlighted headline opens the detailed text associated with that headline. The types of news items that are captured and presented for display (e.g. national, international, entertainment, politics, health, science, etc.) are configurable by the user through the "options" command.

Sports Channel

Sports headlines can be displayed on the Sports channel banner. Headlines from current sports events can also be displayed in rotation. When the user sees an interesting headline, opening the sports channel displays the list of items currently available, with the headline item from the banner already highlighted. Selecting the highlighted headline opens the detailed text associated with that headline. The types of sports items that can be captured and presented for display (e.g. football, cricket, NBA, NFL, MLB, etc.) are configurable by the user through the "options" command.

Advertising Channel

The Advertisement channel can be used to displays promotions and coupon advertisements which can be optimized for display on a user device. There are many occasions where a user would like to go back and review advertisements. By providing and presenting advertisements on a dedicated channel, the user can see the advertisements in one place and can act and use them at some desired time. The advertisements can be created by advertisers using a designated template and guidelines (e.g., adcenter application). As described above, the service application 108 can track and collect information about which advertisements are displayed when a user interacts with the device. The collected information can be sent back to the delivery platform 108 where the activity can be anonymously recorded. In one embodiment, a number of advertisements can be bundled together and send to a user device. As described above, advertisements can be cached locally for multiple viewings to thereby potentially generate additional revenue from a single advertisement transmission to the user device. Other channels and configurations are available.

As an example, assume that 200 advertisements were displayed on user devices which generated counts for the month of January. Each count corresponds to a $10 cost per advertisement. Thus, an amount of revenue generated by the advertisements can be determined for the month of January. The amount of traffic (e.g., transmission costs) that the advertisements consumed can also be quantified. If greater margin is desired, a number of communication and/or advertising parameters can be optimized or adjusted in order to reduce the transmission cost. For example, the size of content can be limited by communicating a limited amount of relevant text rather than the full text. Graphics, pictures, and other bandwidth consuming information related to advertisements and content may also be reduced, limited, or not communicated to the user devices in attempts to reduce transmission costs. While the system 100 and the above-description refer to a number of components, fewer or more components can be used according to a desired functionality or implementation.

Exemplary Operating Environment

Figure 7:
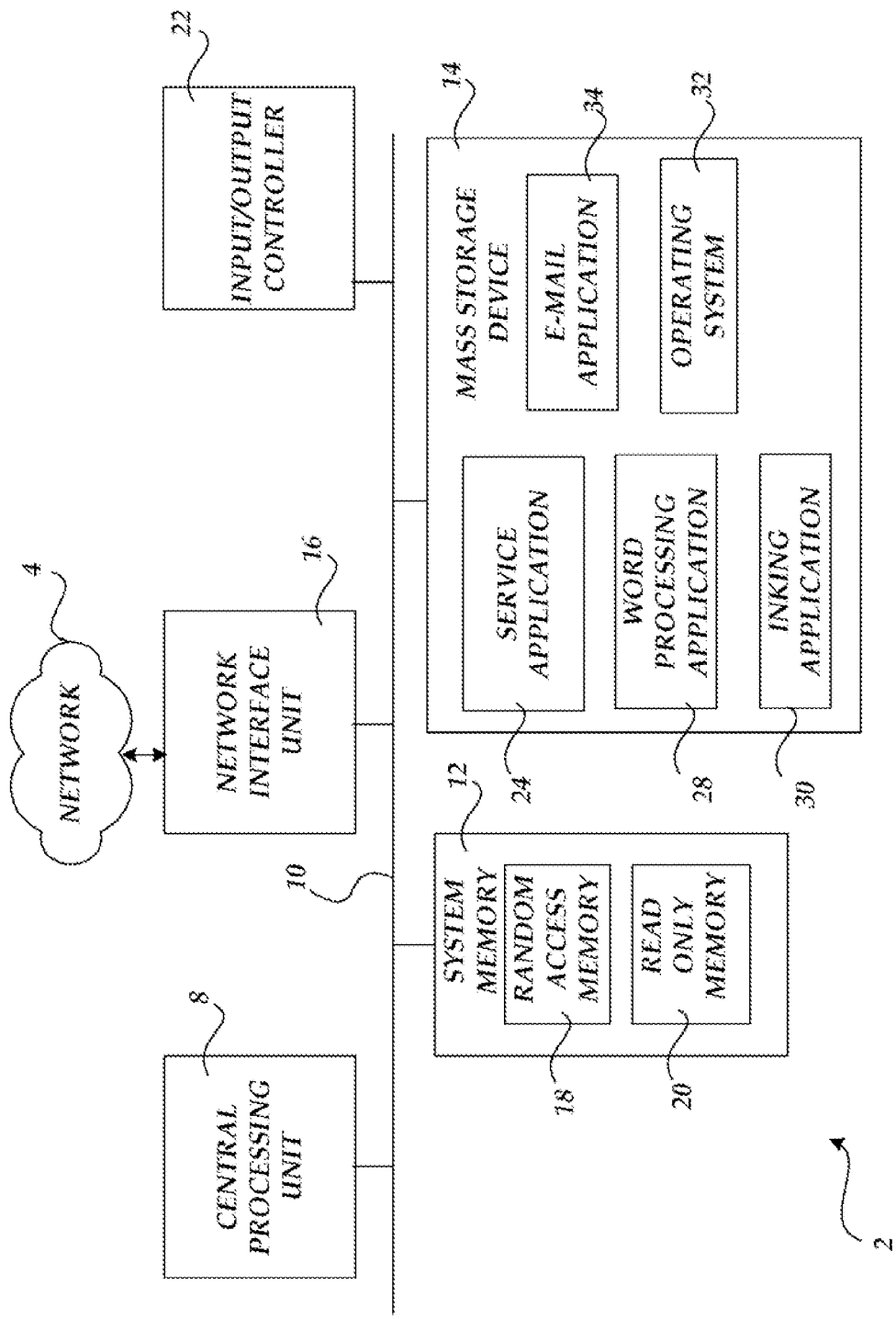
FIG. 7 is a block diagram illustrating a computing environment for implementation of various embodiments described herein.

Referring now to FIG. 7, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 7, an illustrative operating environment for embodiments of the invention will be described. As shown in FIG. 7, computer 2 comprises a general purpose desktop, laptop, handheld, tablet, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The computer 2 further includes a mass storage device 14 for storing an operating system 32, application programs, such as a service application 24, and other program modules. The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of input types, including a keyboard, mouse, pen, stylus, finger, and/or other means. Similarly, an input/output controller 22 may provide output to a display, a printer, or other type of output device. Additionally, a touch screen can serve as an input and an output mechanism.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as a service application 24, word processing application 28, an inking application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-readable medium including executable instructions which, when executed, manage a communication of information by:
    optimizing a number of transmission parameters associated with the communication of information, wherein the information includes content and a number of advertisements used to generate advertising revenue;
    caching one or more of the number of advertisements such that the one or more of the number of advertisements can be used multiple times while having a single transmission cost associated with the transmission of the number of advertisements;
    dynamically displaying the information based in part on an interactive context and user preferences;
    tracking user interactions when one or more of the number of advertisements are displayed; and,
    generating revenue based in part on user interactions including comparing a cost to transmit the content and number of advertisements with an amount of advertising revenue generated by the number of advertisements and adjusting one or more communication parameters to provide a positive amount of residual revenue, wherein the generating includes using the advertising revenue to compensate for the transmission of the information such that a user is not charged for a data transaction fee associated with a communication service.

2. The computer-readable medium of claim 1, wherein the instructions, when executed, manage the communication of the information by caching one or more of the number of advertisements on a delivery platform and controlling the delivery of the one or more of the number of advertisements to a user to maximize an amount of revenue associated with the delivery of the information.

3. The computer-readable medium of claim 1, wherein the instructions, when executed, manage the communication of the information by caching one or more of the number of advertisements on a user device and controlling the delivery of the one or more of the number of advertisements to the user device to maximize an amount of revenue associated with the delivery of the information.

4. The computer-readable medium of claim 1, wherein the instructions, when executed, manage the communication of the information by calculating a cost per advertisement associated with a display of an associated advertisement when a user interacts with a device displaying the advertisement.

5. The computer-readable medium of claim 1, wherein the instructions, when executed, manage the communication of the information by timing a delivery of the information based in part on a peak communication interval associated with a communication network.

6. The computer-readable medium of claim 1, wherein the instructions, when executed, manage the communication of the information by timing a delivery of the information based in part on an off-peak communication interval associated with a communication network.

7. The computer-readable medium of claim 1, wherein the instructions, when executed, manage the communication of the information by charging more for a directed advertisement to an advertising entity based in part on an advertising target.

8. The computer-readable medium of claim 1, wherein the instructions, when executed, manage the communication of the information by optimizing bandwidth, compression, and timing parameters associated with the communication of the information.

9. The computer-readable medium of claim 1, wherein the instructions, when executed, manage the communication of the information by using historical advertising revenue to adjust a number of the communication parameters associated with a delivery of information to an end user.

10. The computer-readable medium of claim 1, wherein the instructions, when executed, manage the communication of the information by managing an amount of information traffic to be communicated during a given time period.

11. The computer-readable medium of claim 1, wherein the instructions, when executed, manage the communication of the information by managing a request frequency and a time period associated with an information request when delivering the information.

12. A system to manage a communication comprising:
a delivery platform to control the communication of information to users associated with a communication service, wherein the delivery platform comprises:
   a data request handling component to determine a number of time periods to deliver the information in an effort to minimize costs associated with the communication of the information including using configuration information to reduce information traffic when responding to an information request; and,
   a compression and formatting component to serialize requested information before responding to the information request including limiting an amount of descriptive information to be included with the requested information; and,
a store to store advertisement counts associated with an advertisement interaction, wherein the system uses an amount of advertising revenue associated with the advertisement interaction to compensate for the transmission of the information which includes a comparison of a cost to transmit content and a number of advertisements with an amount of advertising revenue generated by the number of advertisements and an adjustment of one or more communication parameters to realize residual revenue.

13. The system of claim 12 further comprising a computing device having a cache, wherein the number of advertisements are stored in the cache for viewing multiple times, wherein the number of advertisements can be deleted from the cache upon reaching an expiration event.

14. The system of claim 12, wherein the delivery platform further comprises a cache for storing user preferences and configuration information, wherein the delivery platform can reduce transmission costs by using the user preferences and configuration information when transmitting the content and the number of advertisements to a user.

15. A method of managing a communication of information as part of a communication service using a communication channel comprising:
   optimizing a number of transmission parameters associated with the communication of information including reducing an amount of header information and handshake packet traffic associated with the communication of the information using the communication channel, wherein the information includes content and a number of advertisements;
   packaging the information for communication, wherein the packaging includes using a format having minimal descriptive information associated with an information package;
   saving user preferences including configuration information associated with the delivery of select content, wherein the saving of the user preferences operates to reduce data traffic associated with a request for the information;
   receiving detection information associated with a detection of user interactions when one or more of the number of advertisements are displayed;
   calculating an amount of generated revenue based in part on the detection information associated with the detection of user interactions, wherein the calculating includes comparing a cost to transmit the content and number of advertisements with an amount of advertising revenue generated by the number of advertisements and using the amount of advertising revenue to determine if a cost to transmit information is compensated for by the amount of advertising revenue such that a user is not charged for information transaction fees associated with the communication service; and,
   adjusting one or more communication parameters to provide a positive amount of residual revenue.

16. The method of claim 15, further comprising dynamically displaying the information based in part on the user preferences, including displaying one or more advertisements based in part on a display context.

17. The method of claim 15, further comprising adjusting a delivery time of the content and number of advertisements based in part on a measure of historical advertising revenue.

18. The method of claim 15, further comprising storing the number of advertisements in a local cache for viewing multiple times, wherein the number of advertisements can be deleted from the cache upon reaching an expiration event.

19. The method of claim 15, further comprising adjusting bandwidth and timing parameters as part of the communication of the information to realize a positive revenue stream.

* * * * *